(12) United States Patent  
Gentry

(10) Patent No.: US 6,530,406 B1  
(45) Date of Patent: Mar. 11, 2003

(54) CHAIN TIGHTENING APPARATUS AND METHOD OF USING THE SAME

(76) Inventor: Michael Gentry, 4077 E. 100 N., Rigby, ID (US) 83442

( * ) Notice: Subject to any disclaimer, the term of this patent is extended or adjusted under 35 U.S.C. 154(b) by 0 days.

(21) Appl. No.: 09/962,774

(22) Filed: Sep. 25, 2001

(51) Int. Cl.[7] .............................................. B60C 27/00
(52) U.S. Cl. .................... 152/217; 152/213 R; 152/208
(58) Field of Search ............................ 152/208, 213 R, 152/214, 216, 213 A, 217, 218, 219, 221

(56) References Cited

U.S. PATENT DOCUMENTS

| | | | |
|---|---|---|---|
| 1,221,173 A | * | 4/1917 | Harp .......................... 152/218 |
| 1,560,592 A | * | 11/1925 | McBrady ..................... 152/218 |
| 1,656,849 A | * | 1/1928 | Zaiger ........................ 152/218 |
| 1,659,044 A | * | 2/1928 | Nelson ........................ 152/219 |
| 2,540,230 A | * | 2/1951 | Andrews ..................... 152/218 |
| 2,598,298 A | * | 5/1952 | Pindjak ....................... 152/217 |
| 3,079,972 A | * | 3/1963 | Forman .................. 152/213 R |
| 4,173,244 A | | 11/1979 | Schultz |
| 4,185,674 A | | 1/1980 | Giannone |
| 4,237,951 A | | 12/1980 | Dirks |
| 4,266,593 A | | 5/1981 | Hayashi |
| 4,392,521 A | | 7/1983 | Giannone |
| 4,679,608 A | | 7/1987 | Jeindl |
| 4,799,522 A | | 1/1989 | Ilon |
| 4,922,982 A | * | 5/1990 | Metraux ...................... 152/216 |
| 5,254,187 A | * | 10/1993 | Metraux ...................... 152/170 |
| 5,284,196 A | | 2/1994 | Nielsen |
| 5,785,783 A | | 7/1998 | Thioliere |
| 5,804,001 A | | 9/1998 | Christian |
| 6,026,876 A | | 2/2000 | Snyder |
| 6,085,816 A | | 7/2000 | Clark |

\* cited by examiner

*Primary Examiner*—S. Joseph Morano
*Assistant Examiner*—Long Bao Nguyen
(74) *Attorney, Agent, or Firm*—Parsons Behle & Latimer; James L. Sonntag

(57) ABSTRACT

Apparatus for tightening chains that are installed on a tire, as well as methods for using such apparatus is disclosed. The chain-tightening apparatus provides a mechanism for uniformly tightening the chains, as well as maintaining a constant uniform tension on the chains when the tire moves. The apparatus attaches to the chains quickly and easily, making the method of tightening such chains simple. The apparatus is quickly and easily removed and is easily and compactly stored.

11 Claims, 6 Drawing Sheets

CHAIN TIGHTENING APPARATUS AND METHOD OF USING THE SAME

FIELD OF THE INVENTION

The present invention relates generally to an apparatus for tightening chains placed on vehicle tires and methods for using such an apparatus. In particular, the present invention relates to an apparatus for uniformly tightening the chains for motor vehicle tires and methods for using such an apparatus.

BACKGROUND OF THE INVENTION

During ice, snow or mud conditions, as well as other reduced traction conditions, chains are often installed on motor vehicle tires and trailers to increase traction. A problem often associated with the chains is that they may have a lot of slack and may be quite loose after they are installed. Examples of known devices for increasing the tension on such chains are described, for example, in U.S. Pat. Nos. 4,173,244, 4185,674, 4,237,951, 4,266,593, 4,392,521, 4,679,608, 4,799,522, 5,284,196, 5,785,783, 5,804,001, 6,026,876, and 6,085,816, the disclosures of which are incorporated herein by reference. Many of these chain-tightening devices are extremely complex and difficult to use.

The non-uniformity of the tightening mechanism of other chain tighteners causes many problems. One such problem is chain roll. Chain roll occurs when loose portions of the chain bunch up and create their own rolling action. Such rolling action can lead to gouging and damaging of the tires, requiring the tires to be replaced.

Also, the non-uniformity of the tightening mechanism can lead to chains that are installed too loosely. Many of the known chain tighteners are unable to keep the chain tight during operation, allowing the chain to work loose or shift off-center. In either instance, the loosened or off-center chain can fly up and damage to the vehicle.

SUMMARY OF THE INVENTION

The present invention includes an apparatus for tightening chains that are installed on a tire, as well as methods for using such an apparatus. The chain-tightening apparatus provides a mechanism for uniformly tightening the chains, as well as keeping a uniform tension on the chains while the tire rotates. The apparatus attaches to the chains quickly and easily, making the method of tightening such chains simple.

The present invention comprises a system for tightening a tire chain or like antiskid devise upon a tire. The system comprises a plurality of attachments or hooks for attaching the apparatus to chain links or other suitable attachment points located at radially spaced intervals on the chain. A flexible connector or cable in the form of a closed loop is movably connected to the hooks. An apparatus for taking up slack, such as a reel with a winding inner cylinder, is used to take up slack in the cable and put the cable under tension. When the cable is tensioned there is an essentially constant tension around the loop of the cable imparting at each of the hooks a chain-tightening center-directed radial force. The reel can be locked to main maintain the cable in a tensioned state. When it is desired to remove the apparatus, the lock is released to release the tension on the cable.

The attachment points are radially spaced, which means they are located around a central point, preferably symmetrically and essentially equally spaced. Prefect symmetry and spacing is not required, but spacing should be such that the chain is held in on the tire. It is an essentially symmetrical center-directed force that effectively holds the chain on the tire, and any asymmetry in the attachment of the apparatus of the invention should not significantly compromise the uniformity of the holding force on the chain.

BRIEF DESCRIPTION OF THE DRAWINGS

FIGS. 1–6 are views of chain-tightening apparatus and methods of using the same according to the present invention, in which:

FIG. 1 is a schematic diagram showing one aspect of a chain tightening apparatus of the invention installed on a tire;

FIG. 2 is schematic diagram of an apparatus of the invention when not mounted on a tire.

FIG. 3 is a schematic showing the apparatus and tire as in FIG. 1 from a different view.

FIG. 4 is a schematic of a slack take-up or tightening apparatus of the invention.

FIG. 5 is a schematic similar to FIG. 2, showing another aspect of the invention using cable stops at the slack take-up apparatus.

FIG. 6 is another schematic view of the slack take-up or tightening apparatus of the invention of FIG. 4.

FIGS. 1–6A presented in conjunction with this description are views of only particular—rather than complete—portions of the chain tightening apparatus and methods of using the same.

DETAILED DESCRIPTION OF THE INVENTION

The following description provides specific details in order to provide a thorough understanding of the present invention. The skilled artisan, however, would understand that the present invention can be practiced without employing these specific details. Indeed, the present invention can be practiced by modifying the illustrated apparatus and method and can be used in conjunction with apparatus and techniques conventionally used in the industry.

The chain tightening (CT) apparatus of the invention comprises at least three parts or components. The first part is an attachment for attaching the apparatus to the tire chain. The second part of the invention is a connector for connecting the attachment. The third part of the invention is a slack take-up for drawing up or tightening the connector.

Figure 1:
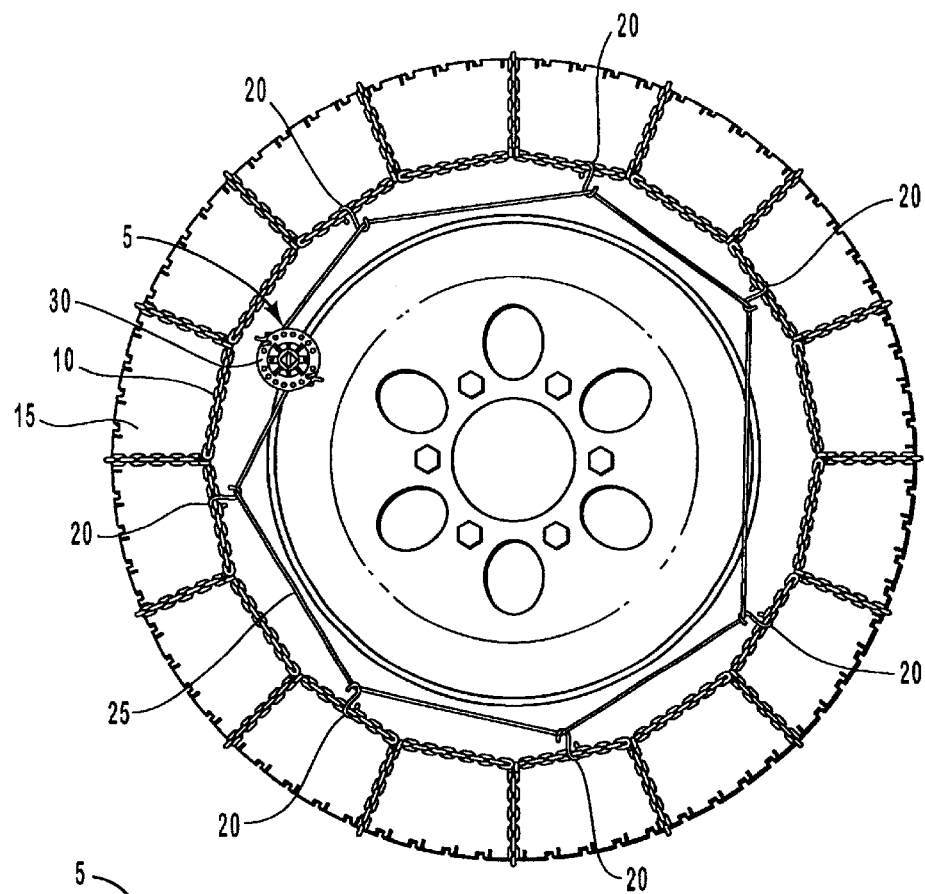
Figure 2:
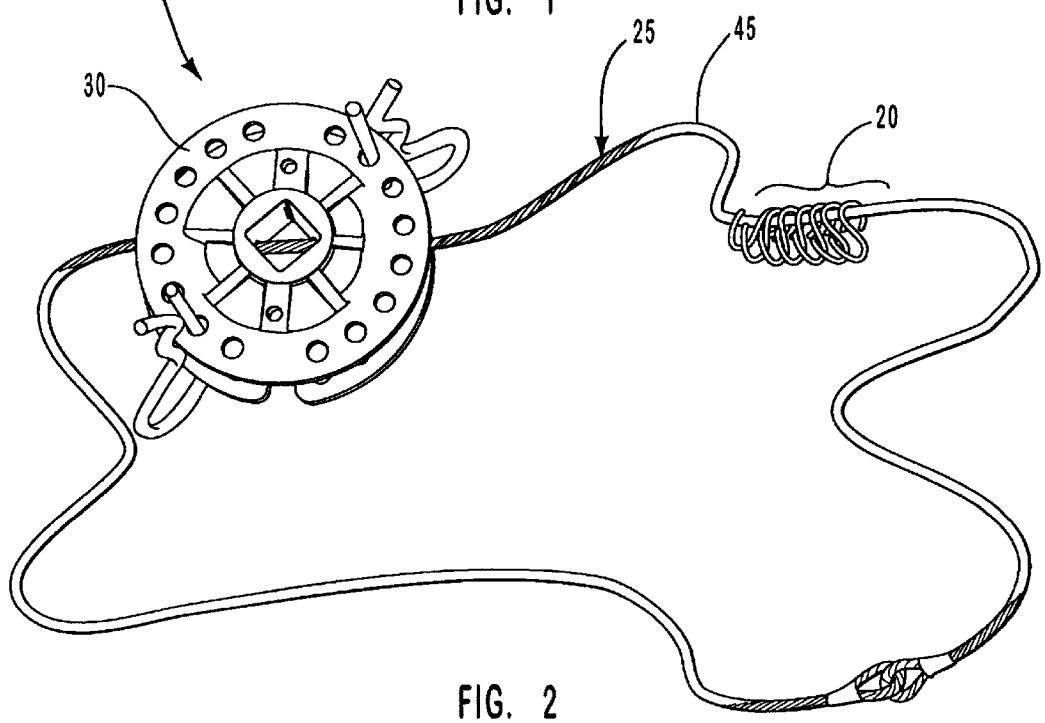
Figure 3:
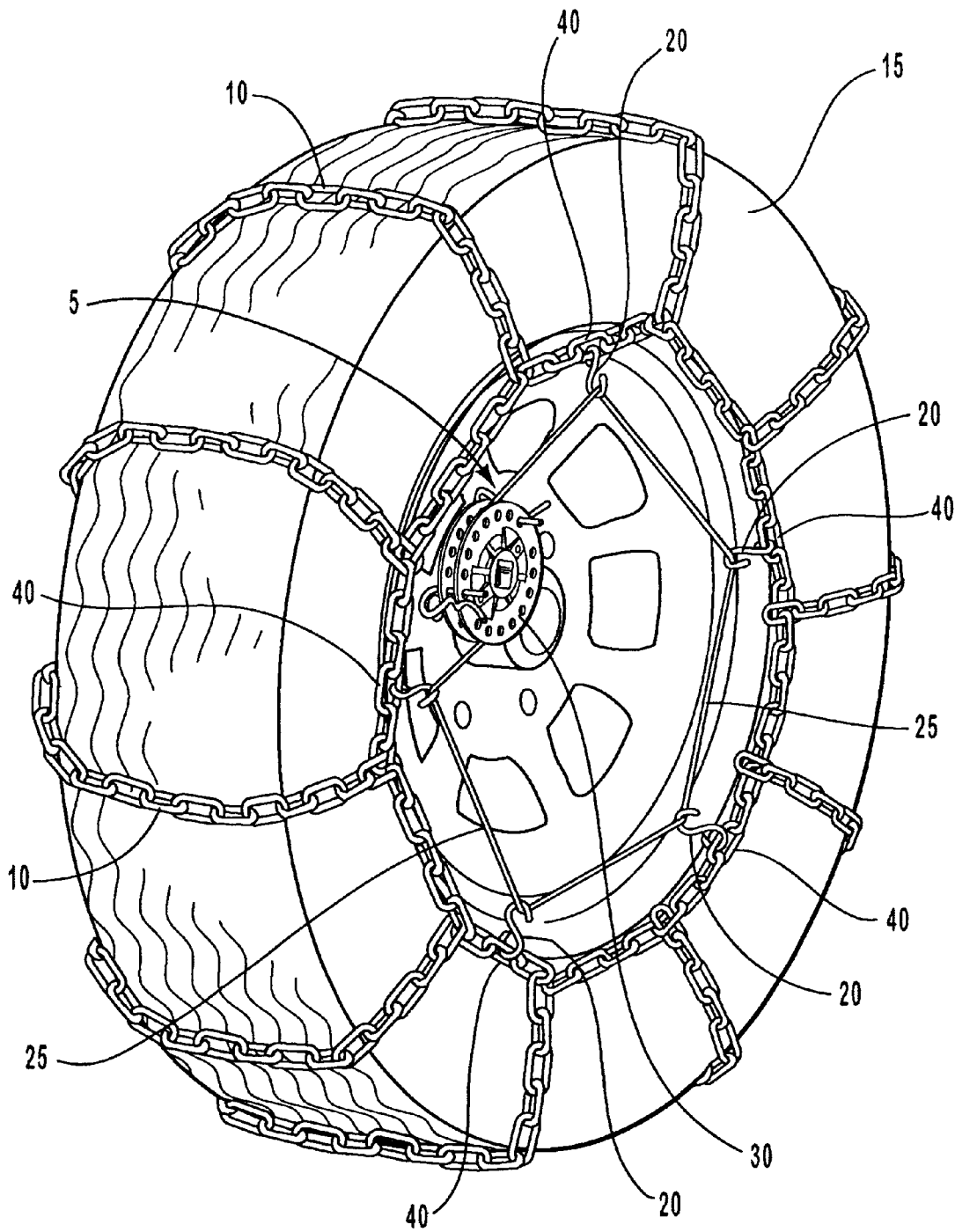

Reference is now made to FIG. 1, FIG. 2, and FIG. 3. The chain tightening apparatus 5 of the invention comprises an attachment 20, a connector 25, and a slack take-up 30. In use, as shown in FIG. 1, the chain tightening apparatus 5 is connected to the chains 10 on tire 15. The apparatus of the invention can be employed on any type of chains 10 known in the art, such as chains for use in mud, ice and snow. Indeed, the apparatus of the invention can be used on any chains used to increase the traction of tires on any type of surface. The only requirement for the chains 10 is that, as described below, the attachment 20 of the chain tightening apparatus 5 is able to attach to the chains.

Tire chains typically comprise two closed loops connected by cross-chains. When attached to the tire, the closed loops extend around the inside and outside sidewalls spaced from the tread with the cross-chains extending over the tread. The apparatus of the present invention is usually connected at spaced intervals on the loop on the outside sidewall. Accordingly the attachments 20 are spaced generally around a circumference of a circle defined by the loop. However, any chain construction that allows such radial spacing of the attachments is contemplated. Such construction includes "chains" or antiskid devices that are not constructed of linked chain structures, but can still provide the attachments as described herein and can be held and tightened on the tire by the tightening force of the invention.

Any tire 15 known in the art can be employed in the invention. The apparatus of the invention 5 can be modified for any size and shape of tire by increasing (or decreasing) the number of attachments 20 and increasing (or decreasing) the length of the connection 25 described below. As well, the apparatus of the invention can be used with tires on self-propelled equipment and on motorized vehicles as well as on other wheeled apparatus pulled by motorized vehicles. For example, the chain tightening apparatus of the invention can be used with tires on cars, trucks, busses, semi-trucks and trailers, farm equipment, commercial equipment, lawn and garden tractors, and self-propelled snowblowers. To illustrate the invention, a tire with a width of about nine inches and a diameter of about 22.5 inches is depicted in FIG. 1.

As illustrated in FIG. 1, the CT apparatus 5 contains attachments 20, connector 25 for connecting the attachments and slack take-up 30. The function of an attachment 20 is to attach the CT apparatus to the chains 10. The connector 25 connects the various attachments 20 together. The slack take-up 30 pulls on or tensions the connector 25 to draw up or tighten the connector.

As mentioned above, the attachments 20 attach the CT apparatus 5 to the chains 10. The attachments 20 can be attached to the desired portions of the chains 10 preferably after the chains are attached to the tire. The attachments 20 are removably attached to the chains so that the CT apparatus 5 can be used together with the chains or so that the chains can be used as-is without the CT apparatus. Once attached and the connector is tensioned, however, the attachments 20 should securely attach the CT apparatus 5 to the chains 10.

Any suitable attachments 20 known in the art accomplishing these functions can be employed in the invention. Examples of such attachments 20 include clips, hooks such as retractable hooks and s-hooks, latches and clasps. Preferably, s-hooks 20 are employed, as illustrated in the figures, as these securely attach to the chains while being removable. As depicted particularly in FIG. 3, the larger loop of an individual s-hook is connected to an individual link 40 of the chain 10. When used in combination with the rest of the CT apparatus 5, an attachment 20 pulls on link 40 which in turn pulls on other connecting links until the links are tight against tire 15.

The attachments 20 are connected to a plurality of locations on the chains 10. The number of the attachments (and the corresponding number of attachment locations on the chains 10) depends on the circumference of the tire, the type (and size) of chains used, the type of attachment and the type of tire used. The number of attachments can typically range from 6 to 10 but a greater number of attachments could be used. In one aspect of the invention illustrated in FIG. 1, 7 s-hooks are employed in the CT apparatus of the invention.

The attachments 20 are also connected to the connector 25. While the attachments 20 and connector 25 can be removably connected, the attachments are preferably permanently connected in a secure fashion to the connector that allows the connector to easily slide through each attachment 20. Any suitable connection system known in the art can be used between the attachment and the connector. The type of connection will depend in part on the attachment used in the CT apparatus. For example, when s-hooks are employed as the attachment, the smaller loop of the s-hook can enclose a cable-type connector as more fully described below.

The connector 25 of the CT apparatus connects through all of the multiple attachments 20. As described in more detail below, the connector 25 is movably connected to the attachments 20. This is required so that when the connector 25 is tightened, the force from the tightening is more or less distributed evenly among the connector. While, an attachment may be fixed to the connector, preferably, no single portion of the connector is immovably attached to any given attachment 20. An example is show in FIGS. 2 and 5, which show a cable connector slidably attached to s-hook attachments. Thus, the connector 25 exhibits the ability to move (or slide) with respect to any given attachment and corresponding chains 10 to which the attachments are connected.

Any connector known in the art functioning in the above manner can be employed in the present invention. Examples of connectors that can be employed in the present invention include wires, straps, cording and cable. Preferably, a cable in the form of a loop is employed as the connector. As illustrated particularly in FIGS. 2 and 5 (showing s-hook attachments together), the cable-type connector 45 connects to all the s-hooks by passing through the s-hooks in a manner that allows the s-hooks to slide along the cable.

The connector 25 is made of any suitable material known in the art that is sufficiently strong, e.g., not breakable when the CT apparatus is used in the manner described herein. Further, the material used for the connector should allow the attachments 20 to easily move along its length. It should be flexible so that it can have various configurations and can be transported easily. As well, the material for the connector should be lightweight. Any materials satisfying these criteria can be employed in the invention as the material for the connector. Exemplary materials for the connector include high-strength polymers, composite materials, metals, and twisted multiple-strand cable. ⅛ inch diameter galvanized aircraft cable employed as the material for the connector has been found suitable.

The length of the connector is such that when attached through the attachments, and the connector is tightened, the combination functions to tighten the chains upon the tire. The size is generally determined by the projected size of the tires for which the chain tightening apparatus of the invention will be used. When cable is used as the connector, the length of the loop of the cable will typically be slightly smaller than the circumference of the tire. In one aspect of the invention, the circumference of the loop is about 5 feet to accommodate standard tire sizes for pick-ups, passenger cars, and sport utility vehicles. In another aspect of the invention, the circumference is about 8 feet to accommodate commercial vehicles, such as semi-trucks and trailers.

Figure 5:
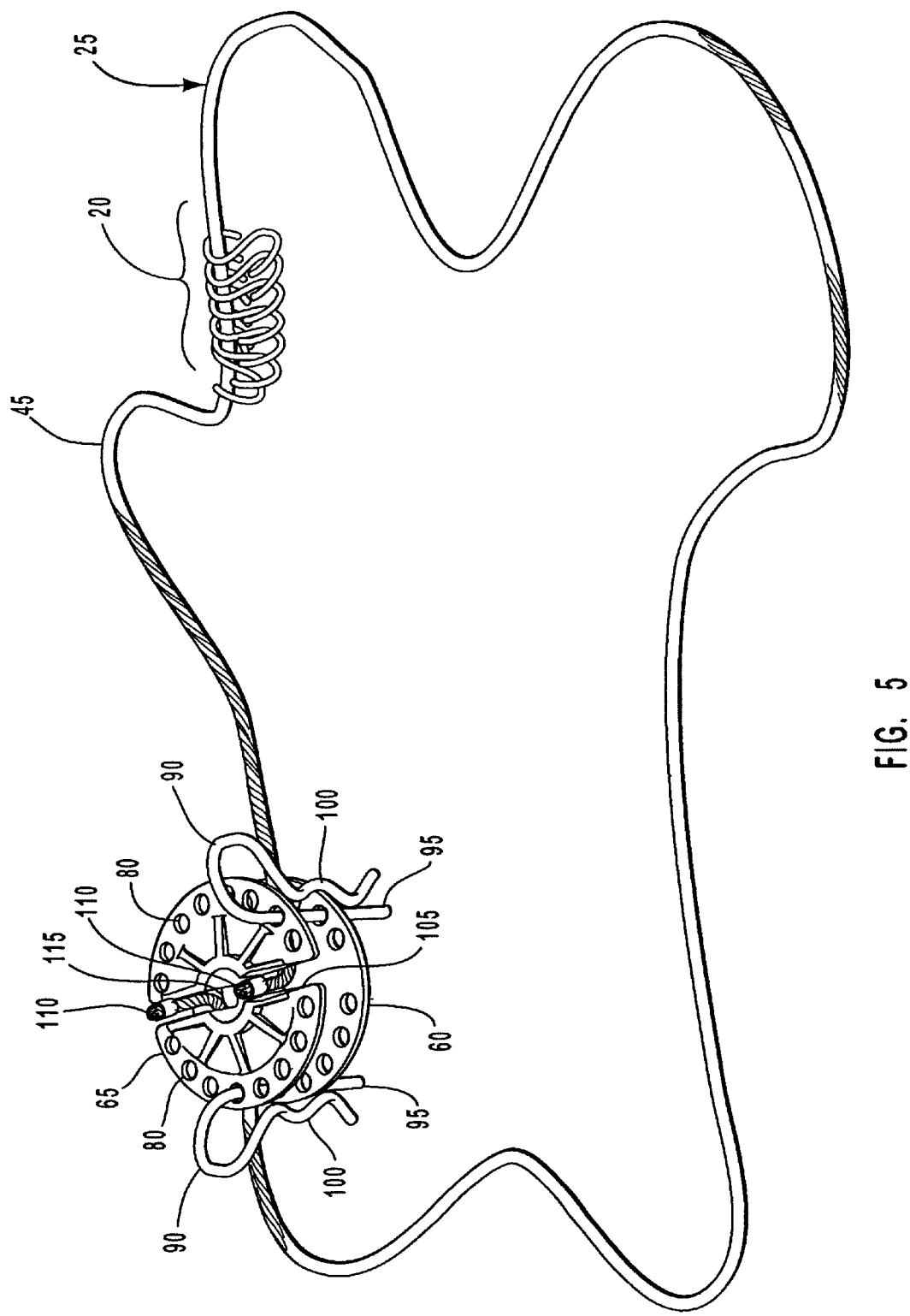

The connector 25 of the CT apparatus 5 may be a permanently closed-end loop on which the slack take-up 30 is non-detachable by virtue of the connector running through a hole in the slack take-up, which in the illustrated slack take-up passes through the inner cylinder 55. Such is the configuration for a standard 5 foot or 8 foot diameter permanently closed-end loop connector in the aspect of the invention illustrated in FIG. 2. In another aspect of the invention, as illustrated in FIG. 5, the connector consists of an open-ended length of a suitable material for the connector 25 (such as a cable) which separately attaches to the slack take-up 30 using, for example, a slotted coupling device on one side of an outer cylinder walls 66 or through a slot 105 in the inner cylinder of the slack take-up 30.

The third component of the CT apparatus is the slack take-up 30. by applying a rotational force to the slack take-up 30, the slack take-up pulls on or tensions the connector 25 to draw up or tighten the connector and then retains the connector 25 in the tightened position while the CT apparatus remains installed on the chains and tire. Any device which accomplishes these functions can be employed as the slack take-up 30 in the invention. See, for example, the device described in U.S. Pat. Nos. 4,173,244, 4,185,674, 4,237,951, 4,266,593, 4,392,521, 4,679,608, 4,799,522, 5,284,196, 5,785,783, 5,804,001, 6,026,876, and 6,085,816, the disclosures of which are incorporated herein by reference.

Figure 4:
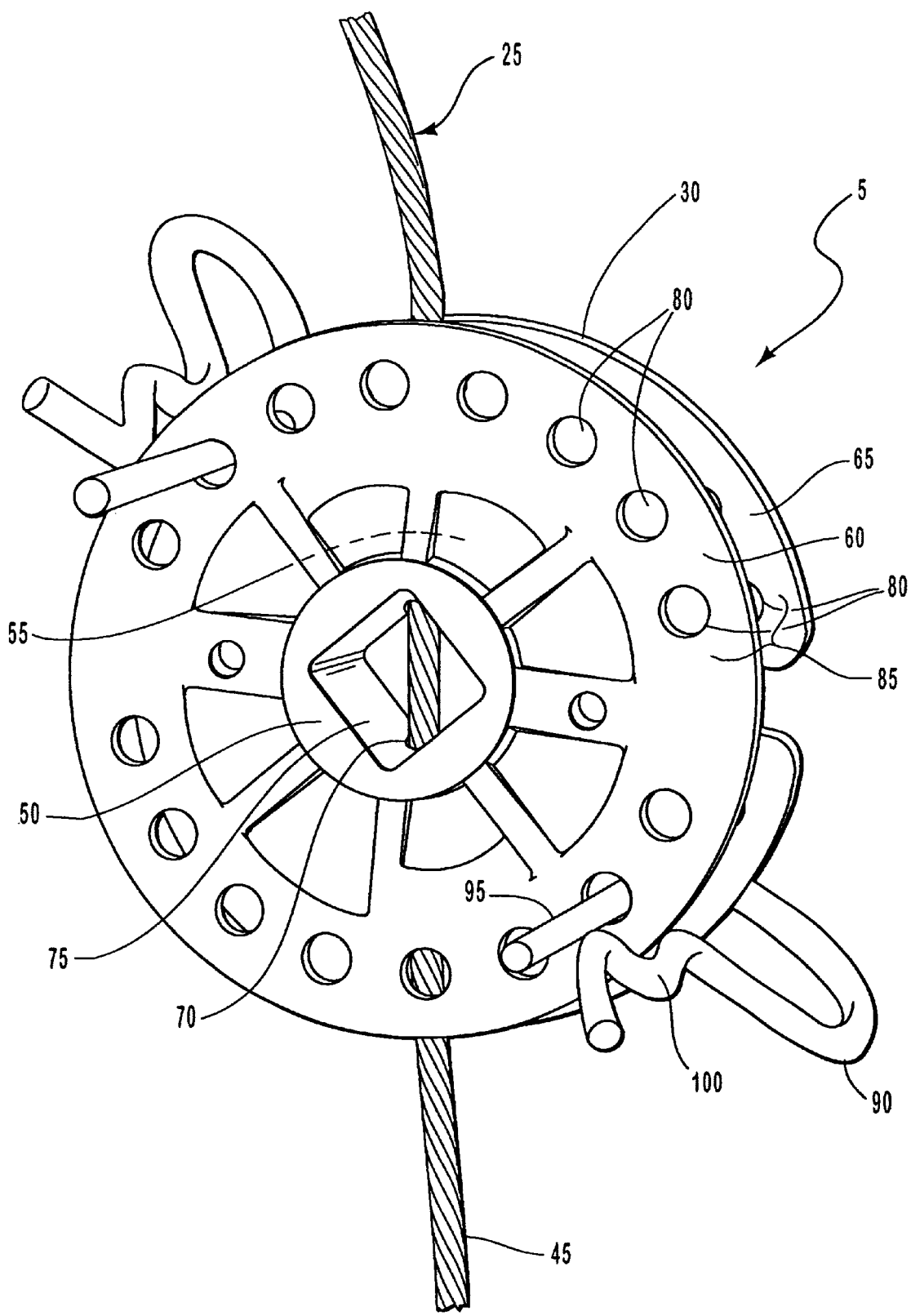
Figure 6:
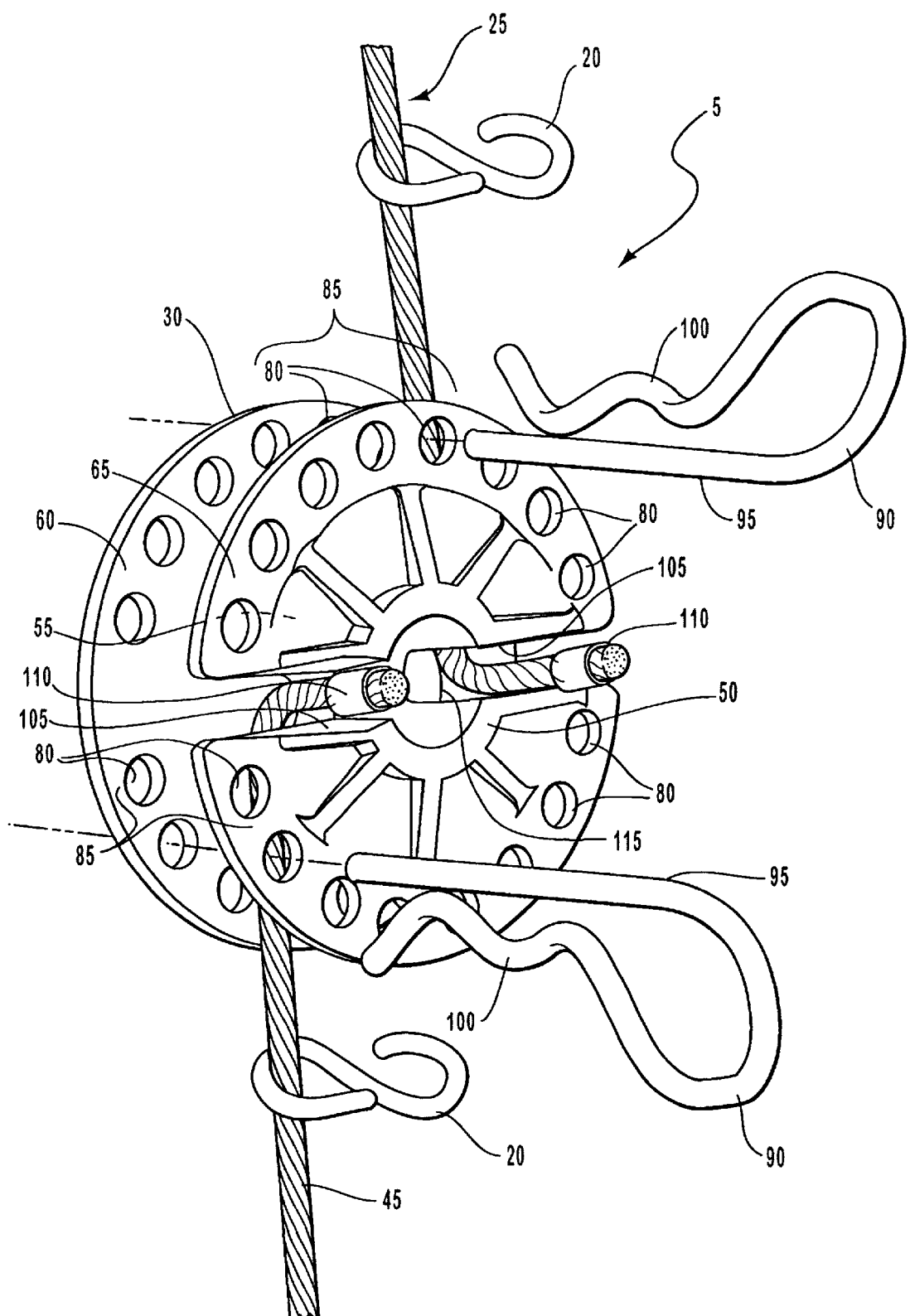

In one aspect of the invention, the device depicted in the figures and shown particularly in FIG. 4 and FIG. 6 is employed as the slack take-up. This device comprises a take-up reel 50 containing an inner cylinder 55 enclosed by two outer circular walls 60 and 65 of a larger diameter. The inner cylinder contains a hole 70 running through its diameter through which a cable-type connector 25 passes. The inner cylinder can be any diameter but is preferably about 1¼ to 1½ inches in diameter. The diameter of hole 70 is sufficient to allow the cable loop to slide easily through the hole.

The diameter of the outer cylinder walls can vary, but should be of sufficient diameter to take up and retain the slack in the connector. In the aspect of the invention illustrated in FIG. 4, the diameter of the outer cylinder walls is about 3 inches. An indentation 75 is located on the outer side of one of the outer cylinder walls at its center. This indentation is designed to operably connect with a tool, or the like, to rotate the slack take-up as described in more detail below. Thus, the indentation 75 can take on any number of shapes and sizes depending on the tool or mechanism used to rotate the slack take-up 30. In one aspect of the invention, the indentation has a rectangular shape as depicted in FIG. 4.

Reference is now also made to FIG. 6. An indented slot 105 extends on the outer side of one of the outer cylinder walls 65 to receive and retain the two ends of an open-ended connector 25. This convention is used to allow any variable length of a connector 25 to be utilized by the CT apparatus in order to accommodate any non-standard tire sizes, such as tires on a large commercial farming tractor. Any closing structure for closing or securing the ends of an open loop cable to form a closed loop is contemplated by the present invention. In the aspect of the invention shown in FIG. 6, each of the open-ended cable ends of a connector are crimped with a stop 110 and cable ends with the stops are each inserted into the indented slot 105 to complete a secured loop of the connector. The connector slack is then drawn up on the reel 50 of the slack take up 30. The stop 110 can be any suitable structure formed by crimping, molding, or bolting, or by any other way of attaching a stop to the cable end. In one aspect of the invention, the inner cylinder also contains a narrow slot 115, extending along a major portion of the width of the inner cylinder through which the open ends of an open-ended connector consisting of a web or woven strapping material can be inserted in opposing directions to complete a secured loop of the connector.

Figure 6A:
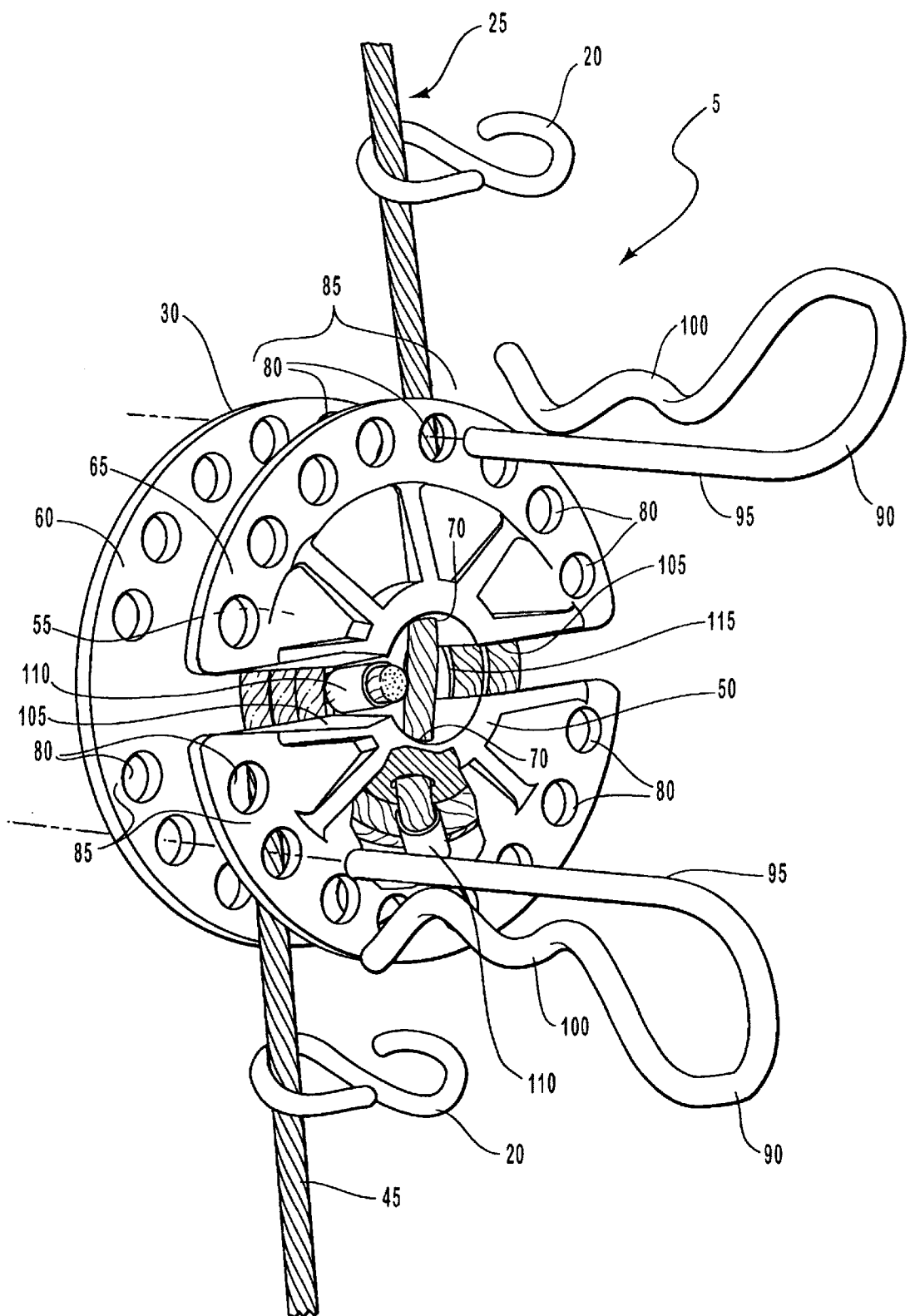
FIG. 6A is a schematic view similar to FIG. 6, showing another aspect of the slack take-up apparatus.

Reference is now made to FIG. 6A. An end of the cable 45 is passed through the cylinder hole 70 and a stop 110 attached to the end to prevent it from passing back through the cylinder hole 70. The other end of the cable is wrapped around the inner cylinder 55 of the take-up reel 50 a enough times to resist unwrapping of the cable (e.g., two or three times) and the free end passed through slot 105. This secures the cable into a closed loop. The connector slack is then drawn up on the reel 50 of the slack take up 30.

Referring again to FIG. 6, the outer cylinder walls 60 and 65 contain a plurality of holes 80 around their outer circumference, with holes on one outer cylinder wall matching corresponding holes on the other cylinder wall to make sets of paired opposing holes 85. Any number and location of holes 80 (and sets of paired holes 85) can be employed consistent with their purpose as described below.

Located on opposing sides of any given outer cylinder wall are retaining pins 90. The retaining pins have a straight side 95 that slides into any given set of paired holes 85. The retaining pins 90 also contain an opposing side 100 that locks the retaining pin 90 into the set of holes 85. Accordingly the pins are locked through the slack take-up 30 during a time the CT apparatus is installed on the tire, but can be manually inserted and removed by hand or by a tool when the tire is not rotating. The opposing side 100 can have any configuration—i.e., shape or size—accomplishing this locking function. In one aspect of the invention, the configuration of the opposing side is depicted in FIG. 6. In this configuration, the opposing side has at least one narrow part in close proximity to the straight side 95 such that when inserted into the set of paired holes 85, the narrow part abuts the edge of at least one outer cylinder. When forced past the edge, the retaining pin 90 thereby locks the take-up reel in that position until manually removed.

The CT apparatus of the invention is used in the following manner. A tire is equipped with a chain as known in the art. A CT apparatus for the given size of the tire and the configuration of the chain is then attached by first attaching multiple attachments 20 on the connector 25. For example, this is performed by providing the s-hooks on a connector 25 in the form of a cable 45, which is shown in FIGS. 2, 4, 5 and 6. Next, the connector 25 is already attached to the slack take-up through the cylinder hole 70 if, for example, a closed-end connector 25 is used; or if an open-end connector securing the connector into a closed loop by any suitable method, such as by attaching the open ends to the indented slot 105 or passing the ends through the slot 115 in the inner cylinder in opposite directions. In each case, the cable is secured to form a completed loop.

The assembled CT apparatus is then placed on chains 10 using the following procedure. The attachments 20 are first attached to the chain approximately equidistant around the circumference of the connector 25. For example, the s-hooks can be attached to individual links of the chain at selected locations. The locations are selected for a uniform spacing between successive s-hooks. The slack take-up 30 is then used to draw up or tighten the connector 25 until the desired tension is reached. In the aspect illustrated in FIGS. 4 and 6, the take-up reel 50 is rotated, usually by means of a tool operably connected at indentation 75, to tighten the connector until the attachments 20 pull the chains 10 into a tight position. Because of the sliding relationship of connector 25 to the attachments 20, a uniform tension will result. When tightened in this manner, the take-up reel 50 is not at the center of the tire. Rather, the take-up reel is on the circumference of the connector similar to that depicted in FIG. 1.

The take-up reel 50 is then locked in the tightened position where uniform tension is distributed throughout the chain by reinserting the previously removed retaining pins 90 while holding the take-up reel with a tool that fits within indentation 75 to wind or draw the excess cable of the loop onto the inner cylinder of the take-up reel. The tool may be any suitable structure that provides the suitable leverage and fits in indentation, such as, for example, a ratchet.

The reinserted retaining pins prevent the connector 25 from unwinding. When the tire rotates, the locked take-up reel retains the connector in its tightened position 30, maintaining the uniform tension obtained when the take-up reel was tightened. When the user wishes to remove the tire chains, the CT apparatus is easily removed by removing the retaining pins, which allows the cable to loosen, permitting the s-hooks to be removed. The chain may then be removed from the tire.

In an alternate aspect of the invention, the CT apparatus has a ratcheting mechanism built into the CT apparatus. In this instance removable pins would not be required. Instead, the mechanism would involve a take-up reel rotating on a second shaft that holds the ratcheting mechanism, with one end of a cable connector attached to an outer wall and the other end connected to the take up reel. The reel is rotated around the ratchet mechanism to take up the slack and would have a release device to allow the ratchet mechanism to release the cable so that the CT apparatus can be removed. Other suitable ratchet, winch, lever or other mechanisms that can take up slack and maintain the tension on the connector as described herein, are contemplated in the present invention.

Unlike apparatus known in the prior-art, the CT apparatus of the invention achieves a uniform tension on the chains. The uniform tension is obtained since the connector is drawn linearly along its circumference creating a corresponding uniform pull of the tire chains in a radial direction through the attachments toward the center of the tire, like pulling the drawstring on a knapsack. The chain links not directly connected to attachments are likewise drawn tight via their linked interconnection to the attached links. None of the apparatus in the prior-art provide this same uniform radial pull by circumferentially tightening the connector.

If desired, any metal parts comprising the CT apparatus can be plastic-coated to inhibit rust formation and other corrosion. The slack take-up can be made from high-impact plastic, metal, or any other suitable material. The size and strength of the individual components will depend upon the size of the tire and the weight of the chains that are installed on the tire.

Having described the preferred embodiments of the present invention, it is understood that the invention defined by the appended claims is not to be limited by particular details set forth in the above description, as many apparent variations thereof are possible without departing from the spirit or scope thereof.

What is claimed is:

1. An apparatus for tightening a tire chain upon a tire that comprises:
   a plurality of hooks for attaching the apparatus to chain links located at radially spaced intervals on the chain;
   a flexible cable in the form of a closed loop that movably connects the hooks;
   slack take up reel comprising an inner cylinder for tensioning the cable by wrapping the cable around the inner cylinder, such that when the cable is tensioned there is an essentially constant tension around the loop of the cable imparting at each of the hooks a chain-tightening center-directed radial force,
   the reel comprising a releasable lock to maintain the cable tensioned, and which can be selectively released to release the tension on the cable.

2. The apparatus of claim 1 wherein the hooks are s-hooks and the flexible cable is threaded through the s-hooks.

3. The apparatus of claim 1 wherein the cable is threaded through the inner cylinder of the take-up reel.

4. The apparatus of claim 1 wherein the lock comprises removable pins passing through sets of paired holes in an outer circumference of the take-up reel.

5. The apparatus of claim 1 wherein the flexible cable comprises an open loop that is secured into the closed loop by closing structure.

6. A tightenable tire chain apparatus comprising;
   a tire chain comprising at least a chain loop adapted for placement around the outer side wall of a tire,
   a plurality of hooks for attaching the apparatus to chain links located at radially spaced intervals on the chain loop;
   a flexible cable in the form of a closed loop that movably connects the hooks;
   slack take up reel comprising an inner cylinder for tensioning the cable by wrapping the cable around the inner cylinder, such that when the cable is tensioned there is a tension around the loop of the cable imparting at each of the hooks a chain-tightening center-directed radial force,
   the reel comprising a releasable lock to maintain the cable tensioned, and which can be selectively released to release the tension on the cable.

7. A method for tightening a tire chain apparatus comprising a chain loop adapted for placement around the outer side wall of a tire:
   attaching a flexible cable in the form of a closed loop to chain links located at radially spaced intervals on the chain loop through a plurality of hooks movably connected by the cable;
   tensioning the cable with a reel comprising an inner cylinder cable by wrapping the cable around the inner cylinder, such that there is an essentially constant tension around the loop of the cable imparting at each of the hooks a chain-tightening center-directed radial force.

8. The method for tightening a tire chain apparatus as in claim 7 wherein the flexible cable in the form of the closed loop is formed by securing ends of an open loop cable with closing structure.

9. An apparatus for tightening a tire chain that comprises:
   a plurality of attachments for attaching the apparatus at locations at radially spaced intervals on the chain;
   connector comprising a flexible closed loop that movably connects the attachments;
   slack take up for tensioning the connector, such that when the connector is tensioned there is a tension around the loop of the connector imparting at each of the attachments a chain-tightening center-directed radial force, the slack take-up comprising a take-up reel with an inner cylinder where the connector is threaded through the inner cylinder.

10. The apparatus of claim 9 wherein the take-up reel comprises a lock for locking the connector in a tensioned condition.

11. The apparatus of claim 10 wherein the lock includes removable pins disposed through paired holes in an outer circumference of the take-up reel.

* * * * *